Oct. 14, 1952 J. C. RICHARDSON 2,613,958
COUPLING FOR DOUBLE-WALLED PIPES
Filed March 5, 1947 2 SHEETS—SHEET 2
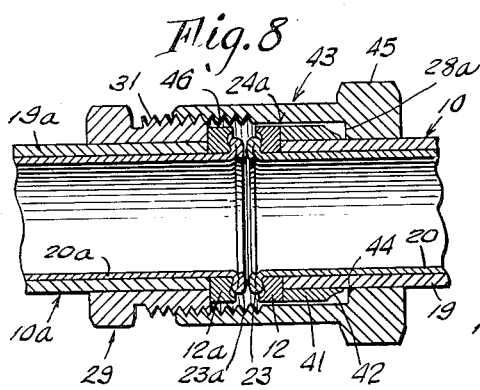
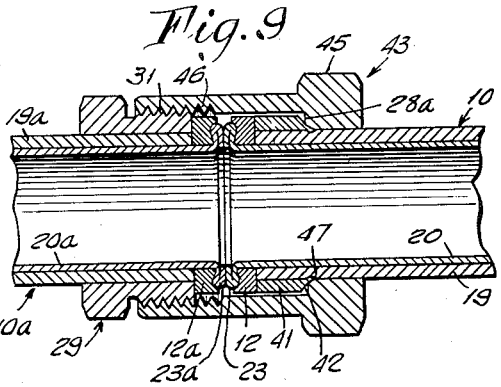
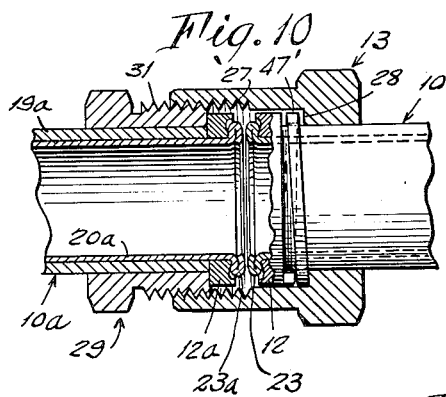
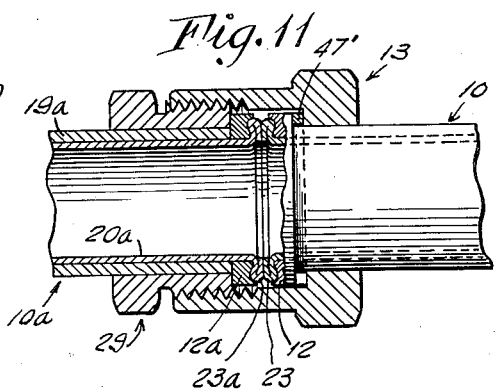
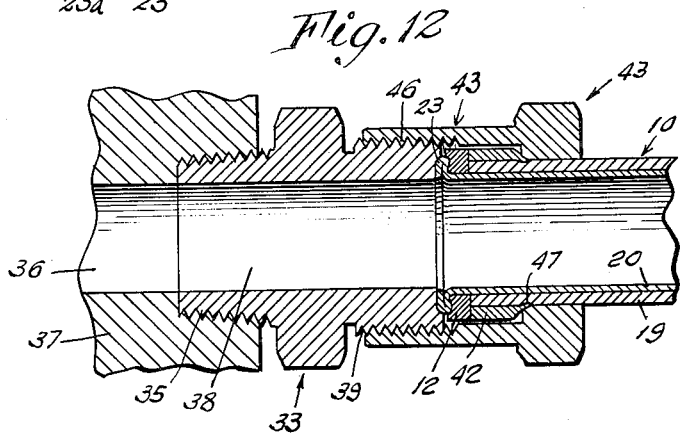
INVENTOR.
James C. Richardson
BY
Johnson, Kline and Hensel
ATTORNEYS Patented Oct. 14, 1952

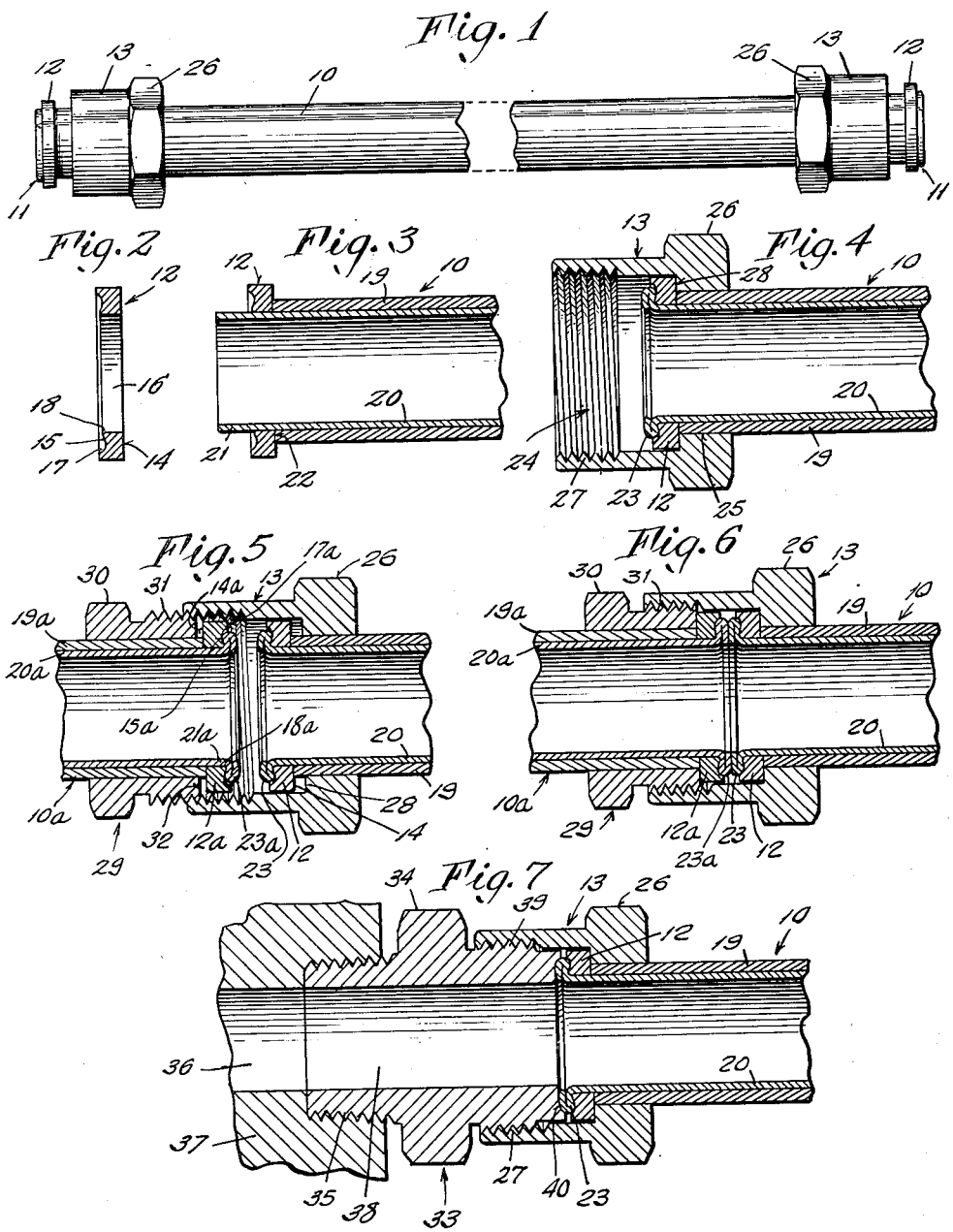

2,613,958

UNITED STATES PATENT OFFICE 2,613,958

COUPLING FOR DOUBLE-WALLED PIPES

James C. Richardson, Waterbury, Conn., assignor to The Brockway Company, Naugatuck, Conn., a corporation of Connecticut Application March 5, 1947, Serial No. 732,485

4 Claims. (Cl. 285—120)

This invention relates to a coupling for multiple-walled ductile threadless pipe, tubing and other hollow conduits (hereinafter called "pipe").

Among the numerous applications developed in recent years for threadless pipe, the conditions to which the pipe is subjected during use have made it desirable or necessary to use multiple-walled pipe, particularly double-walled pipe. For example, in installations where the interior of the pipe is subjected to corrosive fluids, it is desirable to construct the interior or lining of the pipe of corrosion-resistant metal. However, metal suitable for such a lining is often unsuitable from the standpoint of mechanical strength or other properties, or may be too expensive to warrant making the entire pipe wall of sufficient thickness to withstand the mechanical strains to which it is subjected. In such cases it has been found advantageous to provide pipe having an outer wall or sheath of a metal which has the required mechanical properties, and a lining having the desired corrosion-resistant properties. The lining is usually firmly united to the outer pipe in various ways, as by welding or tight frictional engagement.

The provision of coupling means for connecting a multiple-walled pipe to other structures in leaktight relation presents a number of problems not encountered in single-walled pipe. For example, it is usually desirable to arrange the coupling so that only the inner wall or lining of the pipe is exposed to fluids within the coupling. Coupling in which the coupled end of the pipe is not substantially deformed, but is merely gripped by the parts of the coupling, cannot be conveniently used in such manner as to prevent exposure of the outer wall of the pipe to fluids within the coupling. Flaring or flanging of the pipe is often rendered practically impossible or exceedingly inconvenient by reason of the rigidity of one or both walls, and even when it is practical by reason of the ductility of the walls, the operation causes separation of the walls and slipping of one upon the other which interferes with the formation of a leaktight joint or seriously impairs the durability of the installation.

It is an object of this invention to provide a coupling for multiple-walled, particularly double-walled, pipe having no tendency to cause separation of the outer and inner walls thereof, and wherein only the inner wall is exposed to fluids passing through the coupling.

It is a further object to provide a coupling of the aforesaid type wherein a reliable leaktight connection is formed, and the coupled portion of the pipe is adequately supported against deformation and fracture.

In connection with these objects, it is a further object to provide a coupling which is relatively easily and cheaply constructed, and convenient and economical in use.

In accordance with this invention, I remove the outer wall or sheath of the pipe for a short distance from the end thereof, the edge surface of the sheath being cut to provide an axial abutment, e. g. substantially in a plane at right angles to the pipe axis. A ferrule or ring having an outside diameter somewhat greater than the outside diameter of the sheath of the pipe, and having an aperture therein conforming to the outside diameter of the pipe lining, exposed by cutting back the sheath, is then slipped over the projecting end of the lining of the pipe. The ferrule or ring is of such thickness that when backed up against the cut-off end of the sheath of the pipe, the end of the inner wall or lining projects therefrom for a substantial distance. The projecting end of the pipe lining is then subjected to axial compression, whereby the lining bulges outward to form a bead or ridge, and upon continued compression, the two sides of the ridge or bead are forced together to form a double-walled flange, the latter being firmly compressed against the front face of the ring, and tightly clamping the same against the end surface of the sheath.

In order to connect the end of the pipe carrying the ferrule to another structure, a pair of coupling members are provided, one engaging the rear surface of the ferrule and the other being adapted to engage the front surface of the upset flange of the pipe lining in leaktight relation. The two coupling members are interconnected by draft means, so that they are adapted, when brought together, to clamp the upset flange between the front surface of the ring or ferrule and a clamping surface on the other coupling member. A leaktight seal is thus formed between the double-walled flange of the pipe lining and the surface to which it is clamped, effectively protecting the sheath of the pipe from exposure to fluids within the coupling.

Moreover, the ends of a pair of multiple-walled pipes, each having a ferrule and upset flange of the type just described, can be connected together by a pair of coupling members, interconnected by draft means and engaging the rear sides of the two ferrules respectively. A leaktight seal is thus formed between the double-walled flanges of the pipe linings, likewise protecting the outer walls of the pipes from fluids passing through the connection.

The ferrule supports the pipe lining against expansion when subjected to fluid pressure within the couplings; and the double-walled flange, when clamped against the surface to which it is connected, provides the required reinforcement to prevent failure of the lining.

To avoid any tendency of the ferrule to cut into and weaken the upset flange, the corner engaging the base of the flange is preferably rounded or chamfered so that it cannot cut into the metal of the flange.

The front surface of the flange and the opposite surface of the fitting or other structure against which the flange is clamped, are preferably shaped to diverge slightly in radial direction adjacent their inner circumference so as to prevent the metal of the flange from being forced inward toward the bore of the coupling when the clamping surfaces are forced against the flange. Moreover, the two surfaces are preferably shaped to confine the flange against excessive outward expansion. This can be accomplished by making one or both surfaces of shallow concave contour so that their outer portions conform substantially to the shape of the flange, and have a peripheral ridge which confines the outer portion of the flange.

The foregoing principles as they relate generally to the shaping and proportioning of the flange engaging surfaces of pipe fitting elements are explained and claimed in my Patent No. 2,522,194 which issued September 12, 1950.

The draft members advantageously comprise a nut encircling the pipe behind the ferrule for engaging the rear surface of the latter, and having threads for engaging the correspondingly threaded portion on a body or other coupling means to advance the ferrule and bring the flange engaged thereby into clamped relation with the clamping surface on the opposite member. The nut can be externally threaded so as to engage internal threads on the opposite fitting or member, or can be hollow, and provided with internal threads to engage a correspondingly externally threaded portion on the other member. A pair of draft members encircling the ends of a pair of pipes provided with flanges and ferrules in accordance with my invention, and having complementary threaded portions respectively can be used to clamp the ends of the pipes together in leaktight relation.

If desired, additional elements may be included between the draft member and the ferrule to provide other effects in clamping the pipe to another structure. For example, a clamp sleeve having a wedge surface cooperating with a corresponding surface on the draft member can be positioned on the pipe between the furrule and the draft member, so that when the draft member is tightened, the wedge surfaces cooperate to clamp the end of the sleeve against the pipe, as well as to force the ferrule against the flange, thereby providing additional support against lateral or longitudinal displacement of the pipe in the coupling. In another variation, a lock washer may be positioned between the draft member and the rear side of the ferrule to resist loosening of the draft member, and to provide resilient pressure for holding the flange of the pipe against the structure to which it is connected.

My invention will be more fully understood from the following description of a number of embodiments thereof, taken in connection with the accompanying drawings, wherein:

Figure 1 is a side elevation of a length of double-walled pipe provided with the coupling means of my invention at opposite ends thereof;

Fig. 2 is a detail in axial cross-section of a ferrule suitable for use in the coupling of my invention;

Fig. 3 is an axial cross-section of the end of the double-walled pipe of Fig. 1, assembled with the ferrule, prior to formation of a flange thereon;

Fig. 4 is an axial cross-section of an end of the pipe of Fig. 1 after formation of a double-walled flange, and assembled with a coupling member;

Figs. 5 and 6 are axial cross-sections of a coupling connecting the end of the pipe of Fig. 1 to another length of double-walled pipe, Fig. 5 showing the coupling parts prior to the making up of the connection, and Fig. 6 showing the connection fully made up;

Fig. 7 is a view in axial cross-section of a coupling in which the pipe of Fig. 1 is connected to a standard fitting;

Figs. 8 and 9 are views in axial cross-section of a modified form of coupling for connecting together the ends of a pair of pipes provided with the coupling means of my invention, including wedge means cooperating with one of the coupling members;

Figs. 10 and 11 are axial cross-sections of a coupling in accordance with my invention including a lock washer;

Fig. 12 is a view in axial cross-section of a coupling in accordance with my invention made up with a standard fitting and including wedge means for the pipe.

Referring to the drawings, Fig. 1 shows a unit in accordance with my invention, comprising a length of double-walled pipe 10 having at opposite ends thereof an upset flange 11 on the projecting end of the pipe lining, and a pair of rings or ferrules 12 enclosed between said flange and the end of the outer wall or sheath of the pipe. Behind each of the ferrules a hollow nut 13 is carried on the pipe, the nut being retained on the pipe by the ferrules 12.

As shown in Fig. 2, the ferrule 12 is a ring of substantially rigid material, of generally rectangular cross section, having an outside diameter exceeding that of the pipe 10 and an aperture of a diameter conforming substantially to the outside diameter of the lining of the pipe. The rear wall 14 is substantially flat, whereas the front wall has a shallow annular concave surface 15 sloping rearwardly from the edge of the central aperture 16 and having a re-emergent rim 17 at its outer circumference. At the junction of the shallow concave surface 15 with the aperture 16, a rounded corner 18 is preferably formed.

The pipe 10 as shown in Fig. 3 comprises an outer wall or sheath 19, which may be of reinforcing metal such as steel, and a lining 20 which may be of relatively soft metal such as copper or corrosion-resistant metal such as Monel metal, stainless steel, or nickel.

In order to form the end of the unit shown in Fig. 1, the sheath 19 of the pipe 10 is cut back, as shown in Fig. 3, to expose an end portion 21 of the lining 20 of a length adapted to receive the ferrule 12 and to project a substantial distance beyond the ferrule. The end surface 22 of the sheath 19 is preferably made substantially flat to form an abutment for supporting the rear surface 14 of the ferrule.

The ferrule 12 is slipped over the projecting end 21 of the pipe lining and the end portion 21 of the lining projecting beyond the ferrule is subjected to axial compression, for example, by gripping the outer wall 19 of the pipe and forcing the projecting end portion 21 of the lining against a suitable anvil or other supporting surface. The resulting axial compression causes the projecting portion of the lining 21 to expand outward forming a ridge or bead, the side walls of which are then brought together under further compression to form a double-walled flange 23, shown in Fig. 4, which is tightly clamped against the concave shallow front surface 15 of the ferrule. Such formation of the flange 23 tightly clamps the ferrule 12 between said flange and the end surface 22 of the sheath of the pipe against which the rear surface 14 of the ferrule is seated. Moreover, the axial compression to which the projecting end of the lining is subjected, forces the same to expand outward against the ring or ferrule, clamping against the same in radial direction.

The nut or draft member 13 has a cavity 24 therein of sufficient diameter to receive the ferrule 12, and a rear aperture 25, conforming in diameter to the outside diameter of the sheath 19 of the pipe. A hexagonal portion 26 is advantageously provided to engage a wrench or similar tool. The outer portion of the cavity 24 is provided with threads 27 for engaging corresponding threads on the structure to which the pipe is to be connected. Said cavity terminates at its inner end at a rectangular shoulder 28 for engaging the rear surface 14 of the ferrule 12 when the nut 13 is positioned on the pipe 10 behind the ferrule 12 when the nut 13 is positioned on the pipe 10 behind the ferrule, as shown in Fig. 4.

In order to connect the end of the unit shown in Fig. 1 to the end of a similar length of double-walled pipe 10a, as shown in Fig. 5, having a sheath 19a, a lining 20a and a ferrule 12a clamped between an upset double-walled flange 23a on a projecting end portion 21a of the lining and the end surface of the sheath similar to pipe 10. A male draft member 29 is provided encircling the pipe 10a behind the ferrule 12a. The draft member 29 is provided with a bore conforming substantially to the outside diameter of the pipe 10a and encircles the same behind the ferrule 12a. The member 29 has a nut portion 30 of hexagonal shape adapted to engage a wrench at its rear end, while the front portion has external threads 31 adapted to cooperate with the internal threads 27 in the hollow nut 13. The front end surface 32 of the draft member 29 is flat and is thereby adapted to engage the rear surface 14a of the ferrule 12a.

When the male draft member 29 and the hollow nut 13 carried by the pipes 10a and 10 respectively, are threaded together as shown in Fig. 5, they engage the rear surfaces respectively of the ferrules 12 and 12a and force the ends of the pipes together as shown in Fig. 6, finally clamping the upset flanges 23 and 23a, into surface engagement to form a leaktight joint between the two pipes. Since the joint between the pipe ends is formed between flanges 23 and 23a only the metal of the lining 20 and 20a is exposed to fluids within the connection at the junction of the two pipes.

The clamping surfaces 15 and 15a of the ferrules 12 and 12a, which engage the rear surfaces of the flanges 23 and 23a diverge slightly from each other adjacent the bore of the ferrule, and thereby tend to force the material of the flanges 23 and 23a outward in radial direction. The rims 17 and 17a surrounding the clamping surfaces entrap the metal of the flanges preventing excessive expansion thereof. By reason of the rounded shape of corners 18 and 18a on the two ferrules engaging the pipe lining at the bases of flanges 23 and 23a, the ferrules cannot bite into the pipes despite the clamping pressure applied thereto.

Fig. 7 illustrates application of the coupling means on the end of pipe 10, shown in Fig. 1, to connect the end of the pipe to a fitting of standard design. The fitting 33 has a central nut portion 34 for engaging a wrench, a threaded rear portion 35 for securing the fitting in a correspondingly threaded orifice at the mouth of a passage 36 in a structure 37, and a bore 38 through the fitting 33 communicating with a passage 36 in structure 37, and adapted to provide communication with the pipe 10. The opposite or front end of the fitting 33 has external threads 39 for engaging the internal threads 27 on the hollow nut 13 shown in the preceding figures. The front end surface of the fitting 33 is preferably provided with a shallow concave recess 40 which may be similar in shape to the recessed surface 15 on the ferrule 12.

In order to connect the end of the pipe 10 to the fitting 33, the nut 13 carried on the pipe 10 behind the ferrule 12 is threaded on to the externally threaded portion 39 of the fitting 33, until the nut 13 engaging the rear surface of the ferrule 12 forces the same, together with flange 23 against the concave end surface 30 of the fitting 33. Upon tightening the nut, the flange 23 is clamped between the concave surface 15 of the ferrule 12 and the concave surface 40 of the fitting 33 so as to form a leaktight seal therewith. The slight divergence of the surfaces 15 and 40 in radial direction forces the material of the flange 23 outward so as to entrap the metal of the flange. The only metal exposed to the fluids passing through the connection is that of the lining 20 of the pipe 10 and the interior of the fitting 33, so that these parts if constructed of special materials, protect the ferrule and pipe and other portions of the coupling from exposure to the fluids within the pipe.

In the couplings illustrated in Figs. 1 to 7, it will be noted the outer wall or sheath 19 of the pipe 10 is not positively secured in any way to the draft members of the coupling, but is held in place only by reason of its attachment to the inner lining 20 of the pipe. When the pipe 10 is to be subjected to lateral or longitudinal stresses, or to substantial vibration, it is desirable to provide means for firmly securing the outer wall 19 to the coupling. One arrangement providing clamped engagement between the coupling member and the outer wall 19 of the pipe is illustrated in Figs. 8 and 9, as well as in Fig. 12.

As shown in Fig. 8, the pipe 10a to which the pipe 10 is to be connected is assembled with ferrule 12a and male draft member 29 in the same manner as in Fig. 5, while the pipe 10 carries the ferrule 12 as in Figs. 3 to 7, between the upset flange 23 and the end surface 22 of the outer wall 19.

Behind the ferrule 12, the pipe 10 carries a clamping sleeve 41 adapted to bear against the rear surface 14 of the ferrule 12, and having at its rear end a conically tapered wedge surface 42. The hollow nut or draft member 43 (corresponding to the nut 13 in Figs. 1 to 7) has a deeper cavity 24a adapted to enclose not only the ferrule 12, but also the clamp ring 41. The shoulder 28a at the base of the cavity has a rounded inner corner 44 to provide a convergent surface for camming or wedging the rear end 42 of the clamp ring 41 inward against the pipe wall 19, when the nut 43 is forced axially against the clamp ring. Like nut 13, the nut 43 has a hexagonal portion 45 at its rear end for engaging a wrench and internal threads 46 for engaging the external threads 31 on the draft member 29.

In order to make up the connection, the male coupling member 29 carried on pipe 10a behind the ferrule 12a is threaded into the nut 43 carried on pipe 10 behind clamp ring 41. As the draft member 29 and nut 43 are brought together, the nut 43 advances the clamp ring 41 against the rear surface of ferrule 12 and brings the flanges 23 and 23a on the ends of the pipes respectively into face-to-face leaktight engagement as shown in Fig. 9. Final tightening of the nut 43 on the coupling member 29 forces camming surface 44 at its rear end against the conical rear surface 42 of the clamp ring and wedges same inward against the outer wall or sheath 19 of the pipe 10. A small encircling indentation 47 may be made in the sheath, thereby forming a positive connection between the clamp ring and the sheath, lending added support thereto at a point spaced from the end of the pipe, to resist lateral or longitudinal forces applied to the pipe and transmitted to the coupling.

Fig. 12 shows the pipe 10, likewise carrying clamp ring 42 behind the ferrule 12, and including the nut 43 for engaging the clamp ring. In this figure, the nut 43 is secured to the fitting 38, shown in Fig. 7, and hereinbefore described. The threads 46 on nut 43 in this case engage the threads 39 on the fitting, and when tightened to clamping position, shown in Fig. 12, the nut 43 likewise wedges the rear end 42 of the clamp ring 41 against the sheath 19 of the pipe so as to grip and support the same.

In some cases, particularly when the coupling is to be subjected to considerable vibration, there is a tendency for the draft members to be loosened. Means can be provided in such cases to resist relative rotation of the draft members, such means being illustrated in Figs. 10 and 11. Here, pipes 10 and 10a carrying their respective ferrules 12 and 12a are provided with draft member 29 and nut 13 as in Figs. 1 to 7. However, in this case, a lock washer 47', split at one side, formed of resilient material, and bent into helical shape, is positioned on the pipe 10 between the ferrule 12 and the nut 13. The lock washer is of such diameter as to fit into the base of the cavity 24 of the nut.

When the nut 13 is threaded over the draft member 29, as shown in Fig. 11, in order to clamp the flanges 23 and 23a of pipes 10 and 10a together, the lock washer 47' is resiliently compressed between the shoulder 28 at the base of the cavity 24 and the rear surface 14 of the ferrule 12. When thus compressed, the lock washer continually applies resilient force to hold the ends of the pipes 10 and 10a together and to resist rotation of the nut 13 relative to the draft member 29. In this way, the lock washer prevents loosening of the connection when subjected to vibration.

Variations can be made in the constructions hereinbefore described without departing from the scope of my invention. Thus, while the flange-engaging surfaces of the ferrules or of the fittings against which the pipe flange is clamped, are shown as having a concave or hollowed-out shape in order to compress the material of the flange formed of the lining of the pipe outward in radial direction, and to confine the same against excessive expansion in said direction, one or both of these surfaces can be made perfectly flat. However, it is preferable to construct the ferrule and/or the surface against which the double-walled flange is clamped in the manner shown in order to provide a more secure anchorage for the flanges between the clamping surfaces applied thereto.

The embodiment herein described all involve the coupling of double-walled pipe. However, the sheath or the lining can be made up of two or more laminated layers without affecting the operation of my coupling. Accordingly, the term "double-walled pipe" as employed in the claims includes multiple-walled pipe wherein more than one layer is included in the sheath and/or in the lining.

Other variations and modifications can be made in this invention and portions thereof can be used without others.

I claim:

1. In a coupling for threadless pipe, a length of double-walled threadless pipe, having a portion of its lining projecting beyond the end of its sheath, an abutment on the end of said sheath, a double-walled radially extending upset flange on said projecting portion of the lining, a rigid ring of greater diameter than said sheath embracing the projecting end of said lining having a shallow annular cavity on its front surface, receding gradually adjacent the inner circumference of the ring and having a peripheral rim for confining the material of the flange when compressed against said surface, said ring being clamped between said flange and said abutment.

2. In a coupling for threadless pipe, a length of double-walled threadless pipe having a portion of its lining projecting beyond the end of its sheath, a rectangular abutment on the end of said sheath, a double-walled radially extending upset flange on the end of said projecting portion of the lining, a rigid ring of greater diameter than said sheath embracing the projecting end of said lining, having a shallow annular cavity on its front surface, receding gradually adjacent the inner circumference of the ring, and having a rim at its outer circumference for confining the flange when compressed against said surface, and a flat surface on the rear of said ring seated against said rectangular abutment, said ring being clamped between said flange and said abutment.

3. A coupling comprising a pair of lengths of threadless double-walled pipe having portions of their linings projecting beyond the ends of their sheaths, abutments on the ends of said sheaths, a pair of double-walled upset radially extending flanges on the ends of said projecting portions of the linings, a pair of substantially rigid rings of greater diameter than said sheaths embracing the projecting ends of said linings, and clamped between said flanges and said abutments respectively, and a pair of threaded coupling members encircling said pipes respectively behind said rings, bearing against the rear surfaces of the rings and adapted when threaded together to bring the front surfaces of said flanges into clamped leaktight relation with each other.

4. A coupling comprising a pair of ductile threadless pipes, each having at an end thereof a double-walled radially extending upset flange; a rigid ring embracing the end of each of said pipes adjacent and behind its flange and having a flange-engaging surface provided with a shallow annular cavity receding gradually adjacent the inner circumference of the ring and having a peripheral rim for confining the flange material when compressed against said surface, each of said rings having a rear bearing surface substantially perpendicular to the axis of said pipe; and screw threaded draft means rotatably engaging said rear bearing surfaces for forcing said rings and said flanges toward each other, said flange-engaging surfaces diverging slightly from each other in a radial direction adjacent the inner circumferences of said rings so as to forestall any radially inward flowing of the flange material when the flanges are forced together.

JAMES C. RICHARDSON.

REFERENCES CITED

The following references are of record in the file of this patent:

UNITED STATES PATENTS

| Number | Name | Date |
|---|---|---|
| 619,437 | Pool | Feb. 14, 1899 |
| 849,883 | Brinkman | Apr. 9, 1907 |
| 1,265,709 | Dies | May 7, 1918 |
| 1,484,295 | Bundy | Feb. 19, 1924 |
| 1,716,429 | Davies | June 11, 1929 |
| 1,755,210 | Dohner | Apr. 22, 1930 |
| 1,804,814 | Schultis | May 12, 1931 |
| 1,903,736 | Lauster | Apr. 11, 1933 |
| 2,016,375 | Kipnis | Oct. 8, 1935 |
| 2,131,509 | Goepel et al. | Sept. 27, 1938 |
| 2,148,746 | Hampe | Feb. 28, 1939 |
| 2,185,725 | Elliott | Jan. 2, 1940 |
| 2,191,582 | Parker | Feb. 27, 1940 |
| 2,266,796 | Parker | Dec. 23, 1941 |
| 2,300,464 | Parker | Nov. 3, 1942 |
| 2,415,472 | Dorman | Feb. 11, 1947 |
| 2,522,194 | Richardson | Sept. 12, 1950 |
| 2,536,552 | Katz | Jan. 2, 1951 |
| 2,545,930 | Richardson | Mar. 20, 1951 |